(12) United States Patent
Stone et al.

(10) Patent No.: US 6,628,845 B1
(45) Date of Patent: Sep. 30, 2003

(54) METHOD FOR SUBPIXEL REGISTRATION OF IMAGES

(75) Inventors: Harold S. Stone, Princeton, NJ (US); Michael T. Orchard, Princeton, NJ (US); EE-Chien Chang, Singapore (SG); Stephen Martucci, Kendell Park, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 09/526,417

(22) Filed: Mar. 15, 2000

Related U.S. Application Data

(60) Provisional application No. 60/160,590, filed on Oct. 20, 1999.

(51) Int. Cl.$^7$ .................................................. G06K 9/32
(52) U.S. Cl. ...................................... 382/294; 382/280
(58) Field of Search ................................. 382/294, 295, 382/296, 289, 280, 151; 348/263, 264, 95; 358/450

(56) References Cited

U.S. PATENT DOCUMENTS

| | | | | |
|---|---|---|---|---|
| 4,308,521 A | * | 12/1981 | Casasent et al. | 340/146.3 |
| 5,384,648 A | * | 1/1995 | Seidner et al. | 358/534 |
| 5,850,486 A | * | 12/1998 | Maas, III et al. | 382/294 |
| 6,298,363 B1 | * | 10/2001 | Iannuzzelli | 708/400 |

OTHER PUBLICATIONS

M. Berthod, et al., "Reconstruction of High Resolution 3D Visual Information", IEEE, pp. 654–657, 1994.

D. M. Etter, et al., "Adaptive Estimation of Time Delays in Sampled Data Systems", IEEE Transactions on Acoustics, Speech, and Signal Processing, vol, ASSP–29, No. 3, pp. 582–587, Jun. 1981.

C. M. Fan, et al., "A New Image Motion Estimation Algorithm Based on the EM Technique", IEEE Transactions on Pattern Analysis and Machine Intelligence, vol. 18, No. 3, pp. 348–352, Mar. 1996.

P.L. Feintuch, et al., "Time Delay Estimation Using the LMS Adaptive Filter–Dynamic Behavior", IEEE Transactions on Acoustics, Speech, Signal Processing, vol. ASSP–29, No. 3, pp. 571–576, Jun. 1981.

(List continued on next page.)

*Primary Examiner*—Yon J. Couso
(74) *Attorney, Agent, or Firm*—Scully, Scott, Murphy & Presser

(57) ABSTRACT

Methods for registering first and second images which are offset by an x and/or y displacement in sub-pixel locations are provided. A preferred implementation of the methods includes the steps of: multiplying the first image by a window function to create a first windowed image; transforming the first windowed image with a Fourier transform to create a first image Fourier transform; multiplying the second image by the window function to create a second windowed image; transforming the second windowed image with a Fourier transform to create a second image Fourier transform; computing a collection of coordinate pairs from the first and second image Fourier transforms such that at each coordinate pair the values of the first and second image Fourier transforms are likely to have very little aliasing noise; computing an estimate of a linear Fourier phase relation between the-first and second image Fourier transforms using the Fourier phases of the first and second image Fourier transforms at the coordinate pairs in a minimum-least squares sense; and computing the displacements in the x and/or y directions from the linear Fourier phase relationship. Also provided are a computer program having computer readable program code and program storage device having a program of instructions for executing and performing the methods of the present invention, respectively.

27 Claims, 4 Drawing Sheets

OTHER PUBLICATIONS

C.R. Guarino, "A Novel Method For Two–Dimensional Phase Estimation", IEEE, pp. 2279–2281, 1994.

W. R. Hahn, et al., "Optimum Processing for Delay–Vector Estimation in Passive Signal Arrays", Manuscript received Dec. 20, 1972, revised Mar. 17, 1973.

D. Keren, et al., "Image Sequence Enhancement Using Sub–pixel Displacements", IEEE, pp. 742–746, 1988.

N.M. Namazi, et al., "Variable Time Delay Estimation in Colored and Correlated Noise Environment", IEEE Transactions on Aerospace and Electronic Systems, vol. 28, pp. 597–604, Apr. 1992.

M. Namazi, et al., "A New Approach to Signal Registration with the Emphasis on Variable Time Delay Estimation", IEEE Transactions on Acoustics, Speech, and Signal Processing, vol. ASSP–35, No. 12, pp. 1649–1660, Dec. 1987.

F.A. Reed, et al., "Time Delay Estimation Using the LMS Adaptive Filter–Static Behavior", IEEE Transactions on Acoustics, Speech, and Signal Processing, vol. ASSP–29, No. 3, pp. 561–571, Jun. 1981.

H. Shekarforoush, et al., "Subpixel Image Registration by Estimating the Polyphase Decomposition of Cross Power Spectrum", IEEE, pp. 532–537, 1996.

J.A. Stuller, et al., "New Perspectives for Maximum Likelihood Time–Delay Estimation", IEEE Transactions on Signal Processing, vol. 45, No. 3, pp. 513–525, Mar. 1997.

P. Thévenaz, et al., "A Pyramid Approach to Subpixel Registration Based on Intensity", IEEE Transactions on Image Processing, vol. 7, No. 1, pp. 27–41, Jan. 1998.

Qin–sheng Chen, et al., "Symmetric Phase–Only Matched Filtering of Fourier–Mellin Transforms for Image Registration and Recognition", IEEE Transactions on Pattern Analysis and Machine Intelligence, vol. 16, No. 12, pp. 1156–1168, Dec. 1994.

B.S. Reddy, et al., "An FFT–Based Technique for Translation, Rotation, and Scale–Invariant Image Registration", IEEE Transactions on Image Processing, vol. 5, No. 8, pp. 1266–1271, Aug. 1996.

A. Alliney, et al., "On The Registration Of An Object Translating On A Static Background", Pattern Recognition, vol. 29, No. 1, pp. 131–141, 1996.

L. G. Brown, "A Survey of Image Registration Techniques", ACM Computing Surveys, vol. 24, No. 4, pp. 325–376, Dec. 1992.

S. Alliney, et al., "Digital Image Registration Using Projections", IEEE Transactions on Pattern Analysis and Machine Intelligence, vol. PAMI–8, No. 2, pp. 222–233, Mar. 1986.

E. De Castro, et al., "Registration of Translated and Rotated Images Using Finite Fourier Transforms", IEEE Transactions on Pattern Analysis and Machine Intelligence , vol. PAMI–9, No. 5, pp. 700–703, Sep. 1987.

C.D. Kuglin, et al., "The Phase Correlation Image Alignment Method", Proceeding of the 1975 International Conference on Cybernetics and Society, pp. 163–165.

S. Alliney, "Digital Analysis of Rotated Images", IEEE Transactions on Pattern Analysis and Machine Intelligence, vol. 15, No. 5, pp. 499–504, May 1993.

R.L. Allen, et al., "Laplacian and Orthogonal Wavelet Pyramid Decompositions in Coarse–to–Fine Registration", IEEE Transactions on Signal Processing, vol. 41, No. 12, pp. 3536–3541, Dec. 1993.

P.E. Anuta, "Spatial Registration of Multispectral and Multitemporal Digital Imagery Using Fast Fourier Transform Techniques", IEEE Transactions on Geoscience Electronics, vol. GE–8, No. 4, pp. 353–368, Oct. 1970.

M.D. Pritt, et al., "Least–Squares Two–Dimensional Phase Unwrapping Using FFT's", IEEE, Transactions on Geoscience and Remote Sensing, vol. 32, No. 3, pp. 706–708, May 1994.

S.P. Kim, et al., "Subpixrl Accuracy Image Registration by Spectrum Cancellation", IEEE, pp. V–153–V–156, 1993.

F.J. Harris, et al., "On the Use of Windows for Harmonic Analysis with the Discrete Fourier Transform", Proceedings of the IEEE, vol. 66, No. 1, pp. 51–82, Jan. 1978.

I.E. Abdou, "Practical approach to the registration of multiple frames of video images", Part of the IS&T/SPIE Conference on Visual Communications and Image Processing '99, vol. 3653, pp. 371–382, Jan. 1999.

C.L. Chan, et al., "Iterative Maximum Likelihood Displacement Field Estimation in Quantum–Limited Image Sequences", IEEE Transactions on Image Processing, vol. 4, No. 6, pp. 743–751, Jun. 1995.

I.J. Cox, et al, "Predicting and Estimating the Accuracy of a Subpixel Registration Algorithm", IEEE Transactions on Pattern Analysis and Machine Intelligence, vol. 12, No. 8, pp. 721–734, Aug. 1990.

* cited by examiner

METHOD FOR SUBPIXEL REGISTRATION OF IMAGES

CROSS REFERENCE TO RELATED APPLICATIONS

This application is a conversion of provisional application serial No. 60/160,590, filed Oct. 20, 1999.

BACKGROUND OF THE INVENTION

1. Field of the Invention

The present invention relates generally to a method for subpixel registration of images and, more particularly, to a method for subpixel registration of satellite images of the earth's surface to precisely determine environmental changes of the surface.

2. Prior Art

Satellite images of the earth's surface are used to study environmental changes by comparing images of particular areas taken over a period of time. In order to measure the changes due to environmental factors, it is necessary to register the images to each other so that a region in one image is aligned perfectly with the corresponding view of the same region in a second image. When aligned properly, the pixels in the first image lie directly on top of the corresponding pixels in the second image. Image registration may involve translation (side-to-side or up-down movement), rotation, re-scaling by uniform shrinking or enlarging, and more complicated warping of the images.

There are those in the art who have shown that registration has to be very accurate in order to measure environmental change because the disparity observed due to mis-registration cannot be distinguished from changes due to the environment. Therefore, sensitivity to mis-registration is very large, which places a requirement on registration that it be done to subpixel precision.

It is known in the art that the cross-power spectrum of two band-limited images is the Fourier transform of the function $\sin(\Pi x) \sin(\Pi y)/\Pi^2 x\, y$, where x and y are the translational offset of one image with respect to the other. When the cross power spectrum is inverted, one can use two or three samples near the peak and solve for the values of x and y. However, satellite images do not satisfy the band-limiting constraint required for this process. Band-limited images are necessarily very smooth, and do not contain sharp features. Satellite images tend to have many sharp features and contain a good deal of energy in the high frequencies. Thus this process yields inaccurate results when applied to such images.

One method of the prior art proposes to fit a parabola to the correlation peak, and use this fit to obtain an estimate of the peak position. As an alternative it also proposes to fit a Gaussian to the correlation peak. This prior art method also describes a method that takes a somewhat different tack. This scheme computes the phase differences between the Fourier transforms of the two images for the four integer-valued translation amounts nearest to the estimate of the true translation. The scheme computes the final estimate of the true translation by finding the linear interpolation of the four phase-relations that best approximates the observed phase relation.

Others have reported variations of this idea. It is well-known that the phase relation of the Fourier transforms of two images that are slightly displaced with respect to each other contain information about the displacement. Aliasing effects on the transforms make it difficult to extract that information. There are those in the art who have proposed to use the low frequency portion of the spectrum, because that portion is less likely to be aliased.

Another portion of prior art is in the area of time delay estimation in radar and sonar returns in which a maximum likelihood estimator for signal delay is developed, which corresponds to the problem to image translation. This method assumes that both noise and signal are band-limited, and this allows the signal to be interpolated accurately between sample points. In the presence of noise, the registrations are generally not perfect for any delay time, and the problem becomes one of choosing a delay time that is the most likely one in the sense that the noise that explains the discrepancies is the most likely to have been observed. This process uses recursive demodulation to register two signals. The recursion alternates between estimating the delay and estimating the signal. It uses a maximum likelihood criterion that depends on the noise present in the observations. A related scheme for dealing with correlated noise that involves the calculation of the covariance matrix to remove the effects of noise. A later described method produces maximum likelihood estimates from a scheme that is an alternative to the above discussed expansion, which in turn is based on the covariance matrix of the samples. For narrow bandwidth signals, it has been described to use an adaptive delay algorithm that uses a steepest descent technique to find a delay that produces a minimum mean square error.

Others in the art approached this problem as one in adaptive filtering. They describe modifying a filter in real time to adapt to an incoming signal whose delay changes dynamically. They also describe the static and dynamic behavior, respectively, of their tracking scheme.

Phase estimates in radar and sonar systems play a role analogous to estimating time delays of signals. The phase relation of the Fourier transforms of time-shifted signals or pixel-shifted images reveals the amount of the shift. Those in the art described a means for estimating phase by first derivative of the phase, and then performing an integral of the derivative function. This process eliminates ambiguity of multiples of $2\Pi$ that occur when phase is estimated directly. Others presented an alternative method for estimating phase that is done in the Fourier domain on a symmetrized estimate of the phase.

In the area of image registration, still others used a multi-resolution approach to subpixel registration of images based on image features. Their method allows image warping to be one of the image transformations by which two images differ. Because warping is permitted, an ideal registration always exists, and the problem becomes one of deciding which of the possible transforms that give ideal results is the most likely to explain the difference in the images. In some applications, particularly in digital video applications, more than two images of the same scene are available with the scenes differing by small movements. There are those in the art that describe methods for using multiple images to construct a single super-resolution image from which displacements can be calculated to subpixel accuracy. These schemes are based on using averages and interpolations in the pixel domain to construct the super-resolution image.

A method is also known in the art that enables one to predict in advance what the accuracy of subpixel registration can be for a given image. Their scheme is based on the analysis of features within an image. Their registration method matches features, particularly line segments, to find the best match, and they simultaneously give an estimate of the precision of the registration.

The problem of discovering a displacement vector field that describes how two images differ is a registration problem that arises when the differences can be attributed to complex warping transformations. Instead of explaining the differences by a single translation or rotation, or a combination of the two, the differences must be explained by motion directions that could be different at every pixel in a scene. There are those in the art who describe an algorithm based on expectation maximization and have developed a method for this problem when the illumination source is quantum limited. They too use a maximum likelihood estimator to solve this problem.

SUMMARY OF THE INVENTION

Therefore it is an object of the present invention to provide a method for subpixel registration of images which yields accurate results when applied to satellite images.

It is yet a further object of the present invention to provide a method for subpixel registration of images which are not based on using averages and interpolations in the pixel domain.

Accordingly, a first embodiment of the methods of the present invention for registering first and second images which are offset by an x and/or y displacement in sub-pixel locations is provided. The method of the first embodiment comprising the steps of: multiplying the first image by a window function to create a first windowed image; transforming the first windowed image with a Fourier transform to create a first image Fourier transform; multiplying the second image by the window function to create a second windowed image; transforming the second windowed image with a Fourier transform to create a second image Fourier transform; computing a collection of coordinate pairs from the first and second image Fourier transforms such that at each coordinate pair the values of the first and second image Fourier transforms are likely to have very little aliasing noise; computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

Also provided is a variation of the method of the first embodiment of the present invention for registering first and second images which are offset by an x and/or y displacement in sub-pixel locations. The method comprising the steps of: registering the first and second images to the nearest pixel location; and registering the first and second images to the nearest sub-pixel location, wherein the registering of the first and second images to the nearest sub-pixel location comprises the steps of: multiplying the first image by a window function to create a first windowed image; transforming the first windowed image with a Fourier transform to create a first image Fourier transform; multiplying the second image by the window function to create a second windowed image; transforming the second windowed image with a Fourier transform to create a second image Fourier transform; computing a collection of coordinate pairs from the first and second image Fourier transforms such that at each coordinate pair the values of the first and second image Fourier transforms are likely to have very little aliasing noise; computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

In a preferred implementation of the methods of the first embodiment of the present invention, the step of computing a collection of coordinate pairs comprises a conjunction of two or more of the following: fixing the coordinate pairs to lie within a fixed distance of a central peak; fixing the Fourier magnitude of the first image Fourier transform and of the second image Fourier transform to be among the highest predetermined percent of the magnitudes within a fixed distance of a central peak; and setting the ratio of the Fourier magnitude of the first image transform to the Fourier magnitude of the second image transform to lie between $1/(1+\rho)$ and $1+\rho$, where $\rho$ is a positive number.

Also provided is a computer program product embodied in a computer-readable medium for registering first and second images which are offset by an x and/or y displacement in sub-pixel locations. The computer program product comprises: computer readable program code means for multiplying the first image by a window function to create a first windowed image; computer readable program code means for transforming the first windowed image with a Fourier transform to create a first image Fourier transform; computer readable program code means for multiplying the second image by the window function to create a second windowed image; computer readable program code means for transforming the second windowed image with a Fourier transform to create a second image Fourier transform; computer readable program code means for computing a collection of coordinate pairs from the first and second image Fourier transforms such that at each coordinate pair the values of the first and second image Fourier transforms are likely to have very little aliasing noise; computer readable program code means for computing an estimate of a linear Fourier phase relation between the first and second image Fourier transforms using the Fourier phases of the first and second image Fourier transforms at the coordinate pairs in a minimum-least squares sense; and computer readable program code means for computing the displacements in the x and/or y directions from the linear Fourier phase relationship.

Yet still provided is a program storage device readable by machine, tangibly embodying a program of instructions executable by the machine to perform method steps for registering first and second images which are offset by an x and/or y displacement in sub-pixel locations. Wherein the method comprises the steps of: multiplying the first image by a window function to create a first windowed image; transforming the first windowed image with a Fourier transform to create a first image Fourier transform; multiplying the second image by the window function to create a second windowed image; transforming the second windowed image with a Fourier transform to create a second image Fourier transform; computing a collection of coordinate pairs from the first and second image Fourier transforms such that at each coordinate pair the values of the first and second image Fourier transforms are likely to have very little aliasing noise; computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

Still yet provided is a second embodiment of the methods of the present invention for registering first and second images which are offset by an x and/or y displacement in sub-pixel locations. The second embodiment of the method comprises the steps of: (a) Fourier transforming the first image to produce a first image Fourier transform; (b) Fourier transforming the second image to produce a second image Fourier transform; (c) summing the energy of the first image Fourier transform and the energy of the second image Fourier transform and dividing the sum by 2 to produce an average image energy; (d) selecting one or more first displacements for an iterative search; (e) using each first displacement, the first-image Fourier transform, and the second-image Fourier transform to compute a first baseband-plus-aliasing Fourier transform; (f) comparing the energy of the first baseband-plus-aliasing Fourier transform to the average image energy; (g) stopping the search if the energy comparisons are within a fixed precision; (h) continuing the search if the energy comparisons are not within the fixed precision by selecting a new displacement for the search; (i) computing a second baseband-plus-aliasing Fourier transform using the new displacement, first-image Fourier transform, and the second-image Fourier transform; (j) repeating steps (h) and (i) until the fixed precision is reached or a criterion for stopping the search unsuccessfully is satisfied.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Figure 1:
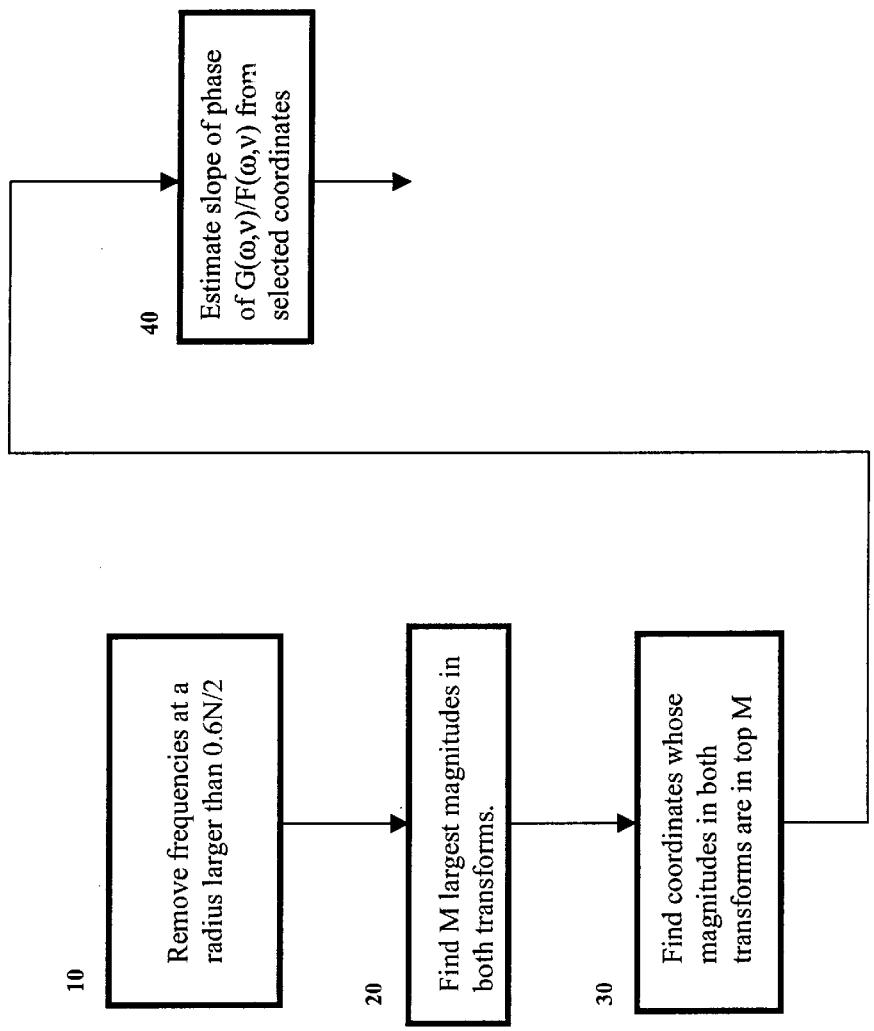
FIG. 1 is a flow chart illustrating the steps of a first method of the present invention.

It is a purpose of this invention to perform registration to subpixel accuracy when images differ only by translation. The methods of the present invention are also useful where images differ by more general transformations, of which translation is one component, because it can be used as one step of a more complex registration procedure.

It is a purpose of this invention to teach means for subpixel registration for translations of a first image with respect to a second image for the case in which the images contain substantial high frequency energy. There are two embodiments of the methods of the present invention described here. A first embodiment is computationally efficient, and can be applied when the amount of high-frequency energy is not very large, but yet is large enough to foil the process taught by the prior art. A second embodiment is more computationally complex, but works when high frequency content is greater than levels accepted by the first embodiment.

The reason that the registration problem is difficult when high frequency energy is very large is that discrete samples of a high-frequency image suffer a problem generally known as "aliasing". To understand this problem, consider an N-sample one-dimensional example. In the frequency domain, the frequency samples are at integer multiples of $2\Pi/N$ for integers in the range 0 to N−1. Suppose that the example before sampling contains frequencies greater than $2(N-1)\Pi/N$. Let one such frequency be $2\Pi(K+N)/N$ where K is an integer less than N. The discrete Fourier transform maps the energy at this frequency into the frequency $2K\Pi/N$ where it is summed together with the energy that is originally present at frequency K. Examination of the discrete spectrum at frequency K cannot directly distinguish between the energy contributions by frequencies K and K+M in the original image. The band-limiting assumption of the prior art is equivalent to the statement that aliasing does not exist because there is no energy in the image at a frequency high enough to be mapped downward to mingle with energy from a lower frequency.

The computational methods described in this invention are unique with respect to prior art in that they attempt to recover a higher frequency spectrum from the images than the sampling rate supports directly. Good estimates of the higher frequency spectrum enable accurate subpixel registration.

The first embodiment of the methods of the present invention assumes that the amount of energy aliased is not large. First the images are registered to the nearest pixel using a method from the prior art. The method of the first embodiment starts at this point and finds the registration to the nearest subpixel.

For simplicity, the method of the first embodiment is described for one-dimensional data, and then shown how it generalizes to two dimensions. Let the discrete Fourier transform of a first image be F(w). Let a second image differ from the first image by a translation, and let its discrete Fourier transform be $G(\omega)$. In the absence of aliasing, it is well known that $G(\omega)=F(\omega)e^{-j2\pi a x/N}$ where x is the amount of translational shift difference in the images. The term $e^{-j2\pi a x/N}$ is the phase difference of complex coefficients in the respective transforms. The phase difference between the two spectra grows linearly with x, the translational offset. The method of the first embodiment estimates the slope of the phase function with respect to $\omega$. The slope is $2\Pi x/N$. Given the slope, one can solve for x.

Alaising corrupts the spectra of $F(\omega)$ and $G(\omega)$. In the absence of aliasing, $G(w)=F(w)e^{-j2\pi a x/N}$. In the presence of aliasing, the frequency component $F(\omega)$ contains energy from at least F(K) and F(K+N) in the full frequency spectrum. Likewise, frequency component $G(\omega)$ contains energy from at least G(K) and G(K+N) in the full frequency spectrum. The phase of G(K) differs from the phase of F(K) by $j2\Pi Kx/N$ for a shift of x. But the phase of G(K+N) differs from the phase of F(K+N) by $j2\Pi(K+N)x/N$, which is greater than $j2\Pi Kx/N$ by an amount equal to $j2\Pi x$. If x happens to be an integer, then the additional phase difference is an integer multiple of $2\Pi$, which is equal to 0 phase. For subpixel shifts, the additional phase shift is not zero, and modifies G(K+N) in a way inconsistent with the assumption that $G(\omega)$ differs from $F(\omega)$ by a phase that changes linearly with $\omega$. If the aliasing energy is small, however, then the phase relation is changed minimally, and examining a multiplicity of components can discover the linear phase relation.

Figure 4:
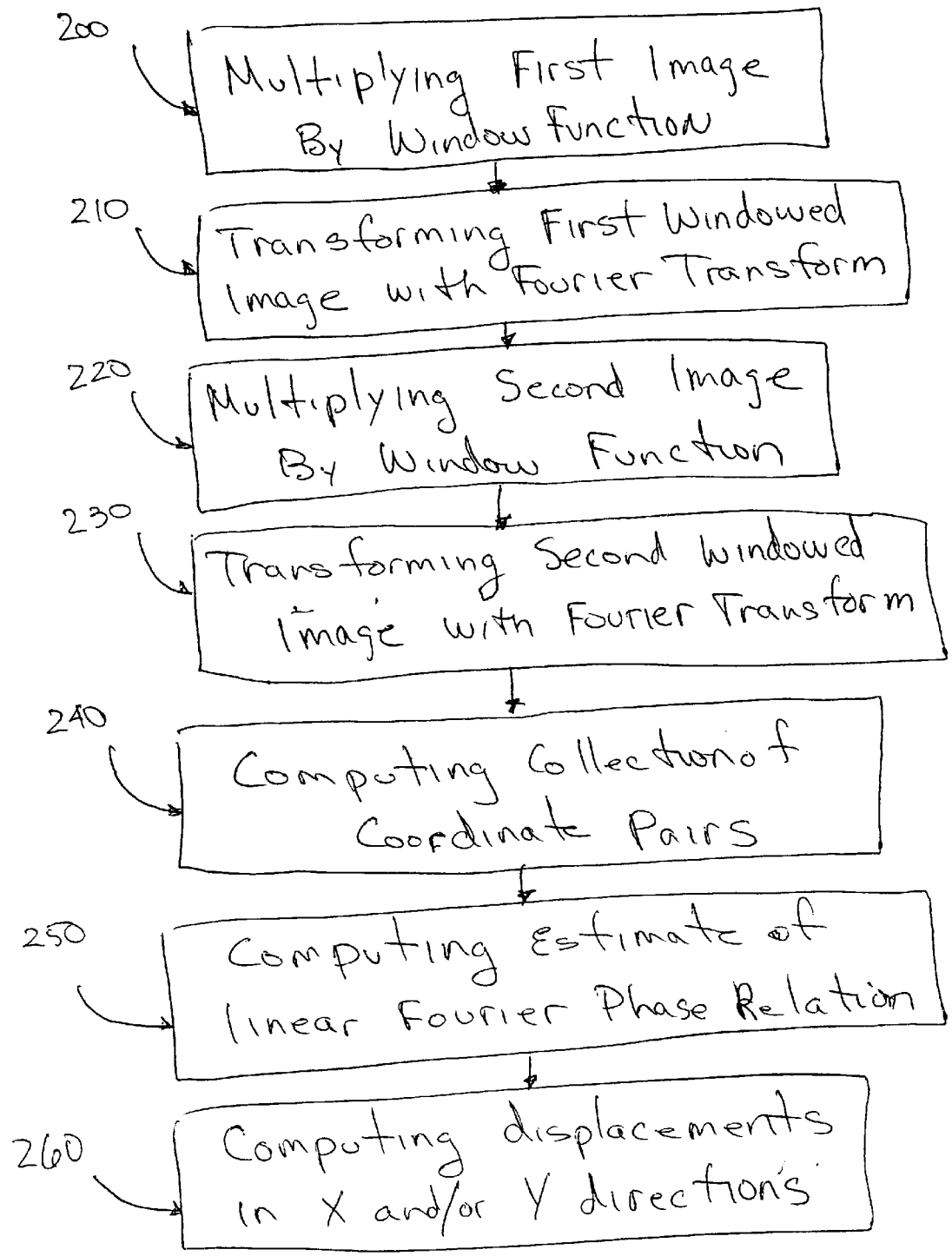
FIG. 4 is a flow chart summarizing the steps of the first method of the present invention.

The method of the first embodiment is preferably comprised of the following steps with reference to FIG. 4:

1. The first and second images to be registered are multiplied pixel-by-pixel by a window function. An appropriate window is the 3-term Blackman window or the 4-term Blackman-Harris window, which yields slightly better results for a slightly higher computation cost. The periodic forms of the these windows are preferred to the symmetric forms.

2. The Fourier transforms are taken of the first and second windowed images, respectively.

3. Limit the attention of the algorithm to the frequencies that lie within a fixed radial distance from the central peak. Let the minimum of the width and height of the Fourier transforms be N. Then the maximum radius around the central peak of a circle that falls within the transform is N/2. Set the fixed radius to αN/2. A suitable value for α is 0.6.

4. Within that region, for each of the two transforms, find the coordinate pairs of the M largest amplitudes of the frequency components. A suitable value of M is 25 percent of the number of components within the circle of fixed radius.

5. From these two sets of M coordinate pairs, select the subset that lies within both sets. The frequency components associated with those coordinate pairs are the components that satisfy the selection criteria.

6. Using just the frequency components that satisfy the criteria, calculate the slope of the line that best approximates a linear phase relationship between $F(\omega)$ and $G(\omega)$). A suitable method is a linear least-squares calculation. The linear phase estimate of the slope is an estimate of the product $S=2\pi x/N$. Solve for x by calculating $N\ S/2\pi$. Let x be the estimate for the subpixel translation.

The reasoning behind these steps is as follows.

Step 1: It is well-known that discrete Fourier transforms exhibit anomalous spectral leakage caused by boundary effects. When two images to be registered contain information all the way out to their respective boundaries, it is necessary to eliminate the boundary effects by zeroing out the pixels at the boundary and de-emphasizing pixels near the boundary. Methods of the prior art show that various windows can remove the effects at the boundary. The window operation is a point-by-point multiply of the image data by the window coefficients.

Step 3: For images, energy tends to concentrate in the low frequencies. Aliasing energy maps into baseband frequencies in a way that tends to map the higher aliasing magnitudes onto high baseband frequencies and lower aliasing magnitudes onto low baseband frequencies. Hence, the effects of aliasing tend to be less in the low frequencies because the ratio of aliasing energy as compared to normal energy tends to be lowest in the low frequency range. Therefore the low frequencies tend to yield the best estimates of a linear phase relation. There are those in the art who have proposed this idea, but the idea by itself does not eliminate aliasing effects that compromise the precision of the registration.

Steps 4 and 5: The effects of aliasing are proportional to the ratio of the aliasing magnitude to the base frequency magnitude. By selecting only those coordinates with large magnitudes, the method selects components in which aliasing effects are small, and therefore have higher accuracy than coordinates associated with small magnitudes.

Step 6: This step calculates the best slope with respect to a widely used criterion that is meaningful in many situations.

Figure 2:
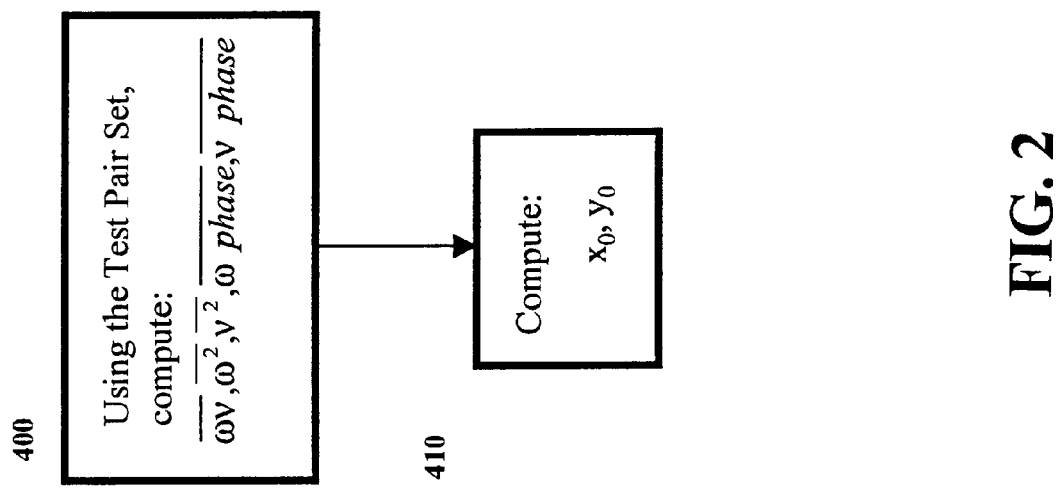
FIG. 2 is a flow chart further illustrating step 40 of FIG. 1.

The method of the first embodiment for 2-dimensional images is illustrated schematically in FIGS. 1–2. Step 10 of FIG. 1 restricts the frequencies to a radius of $\alpha*N/2$ where N is the minimum of the width and height of the image. Recall that a suitable value for α is 0.6, but many other nearby values work about as well. Step 20 finds the largest M magnitudes in the Fourier transforms of each of the images. Recall that a suitable value for M is 25 percent of the coefficients found in Block 10. Other values in the range 10 percent to 40 percent work about as well. Step 30 finds all frequency coordinates whose corresponding Fourier magnitudes in each transform are among the top M. Step 40 computes the estimate of the slope of the phase relation between $G(\omega,\nu)$ and $F(\omega,\nu)$ for all frequencies that are retained by Step 30.

FIG. 2 schematically illustrates the computation within Step 40 of FIG. 1. Step 400 computes the quantities $\overline{\omega\nu}$, $\overline{\omega^2}$, $\overline{\nu^2}$, $\overline{\omega phase}$, and $\overline{\nu phase}$ from the formulas below by summing over all pairs $(\omega,\nu)$ in the Test Pair Set.

$$\overline{\omega\nu} = (1/N)\sum_i \sum_j \omega_i \nu_j \quad (1)$$

$$\overline{\omega^2} = (1/N)\sum_i \omega_i^2 \quad (2)$$

$$\overline{\nu^2} = (1/N)\sum_i \nu_i^2 \quad (3)$$

$$\overline{\omega phase} = \sum_i \sum_j \omega_i phase(G(\omega_i,\nu_j)/F(\omega_i,\nu_j)) \quad (4)$$

$$\overline{\nu phase} = \sum_i \sum_j \nu_j phase(G(\omega_i,\nu_j)/F(\omega_i,\nu_j)) \quad (5)$$

Step 410 computes $x_0$ from the formula:

$$x_0 = \left(\frac{N}{2\pi}\right)\left(\frac{\overline{\omega\nu}\cdot\overline{\nu phase} - \overline{\nu^2}\cdot\overline{\omega phase}}{(\overline{\omega\nu})^2 - (\overline{\omega^2})(\overline{\nu^2})}\right) \quad (6)$$

Step 410 computes $y_0$ from the formula:

$$y_0 = \left(\frac{N}{2\pi}\right)\left(\frac{\overline{\omega\nu}\cdot\overline{\omega phase} - \overline{\omega^2}\cdot\overline{\nu phase}}{(\overline{\omega\nu})^2 - (\overline{\omega^2})(\overline{\nu^2})}\right) \quad (7)$$

This completes the processing contained within Step 40 of FIG. 1.

A second embodiment of the methods of the present invention estimates the aliasing components in the Fourier transforms $F(\omega)$ and $G(\omega)$, and attempts to remove them. If the aliasing components can be eliminated successfully, the residual values of the transforms contain sufficient information to estimate the relative phase of the transforms accurately. The relative phase of $F(\omega)$ and $G(\omega)$ is equal to the subpixel translation of the images from which the transforms are created.

To estimate the aliasing effects, it is assumed that aliasing effects are dominated by aliasing from the range of frequencies adjacent to the base range, and frequencies higher than that are ignored. In one dimension, with the origin in the center of the range, the base set of frequencies X consists of integers in the range $-N/2 \leq \omega < N/2$. Since the discrete Fourier transform is periodic, it simplifies the analysis somewhat to shift the range of ω to the range $0 \leq \omega < N$. The spectrum of a continuous image is infinite in extent, but the envelope of the spectral components drops off as frequencies increase. For purposes of aliasing, we consider a representation of the continuous image by means of a spectrum of length 2N, with frequencies in the range $0 \leq \omega < 2N$. Let this representation in the frequency domain be $H(\omega)$, for $0 \leq \omega < N$. In creating this representation, we assume that the energy in $H(\omega)$ contributes the majority of the aliasing energy contained with the N samples of $F(\omega)$. The spectral components of the sampled image obey the equation $F(\omega)=H(\omega)+H(\omega+N)$. Let $G(\omega)$ be the transform of the image shifted by the amount x, so that its transform is $G(\omega)=H(\omega)e^{-j2\pi\omega x/N}+H(\omega+N)e^{-j2\pi(\omega+N)x/N}$. An objective of this invention is to use $F(\omega)$ and $G(\omega)$) to estimate the values of $H(\omega)$ and $H(\omega+N)$. Then $H(\omega+n)$ can be eliminated and the amount of the shift from the unaliased components within $H(\omega)$, for $0 \leq \omega < N$ can be computed.

To solve for $H(\omega)$ and $H(\omega+N)$, note that the two equations above can be written in matrix form as:

$$\begin{bmatrix} F(\omega) \\ G(\omega) \end{bmatrix} = \begin{bmatrix} 1 & 1 \\ e^{-j2\pi\omega x/N} & e^{-j2\pi(\omega+N)x/N} \end{bmatrix} \begin{bmatrix} H(\omega) \\ H(\omega+N) \end{bmatrix}, \text{ for } 0 \leq \omega < N \quad (8)$$

The inverse relation is:

$$\begin{bmatrix} H(\omega) \\ H(\omega+N) \end{bmatrix} = \left( \frac{1}{e^{-j2\pi(\omega+N)x/N} - e^{-j2\pi\omega x/N}} \right) \begin{bmatrix} e^{-j2\pi(\omega+N)x/N} & -1 \\ -e^{-j2\pi\omega x/N} & 1 \end{bmatrix} \begin{bmatrix} F(\omega) \\ G(\omega) \end{bmatrix}, \quad (9)$$

$$\text{for } 0 \leq \omega < N$$

Note that the inverse exists and is unique provided that the expression $e^{-j2\pi(\omega+N)x/N} - e^{-j2\pi\omega x/N}$ is nonzero. The expression is zero only at integer values of x, which correspond to shifts of an integer number of pixels. For subpixel shifts, the value cannot be zero.

For each subpixel shift, we can find a different distinct pair $H(\omega)$ and $H(\omega+N)$. To obtain a pair that gives the best estimate of x, we make use of Parseval's theorem. Parseval's theorem states that the energy expressed by the sum of squares of all pixel values in the image domain is exactly equal to the energy in the sum of squares of magnitudes of Fourier components of the image. Thus the energy within $F(\omega)$ is equal to the energy within the image.

Consider the class of images with limited aliasing energy in the double frequency range and no significant energy outside of that range. That is, the majority of the energy is contained with $H(\omega)$, and very little energy is in the spectrum $H(\omega+N)$. For each possible shift of amount x, we obtain estimates for the spectra, denoted as $H_x(\omega)$ and $H_x(\omega+N)$, respectively. Observations on synthetic data for which exact answers are known show that the following equality holds when F and G are spectra of functions whose relative displacement is x, and x is a fraction of a pixel.

$$(\tfrac{1}{2})(\|F\|^2+\|G\|^2)=\|H_x\|^2+\|G_x\|^2 \quad (10)$$

where the notation $\|F\|^2$ denotes the sum of the squares of the complex magnitudes of F. Note that one compute $\|F\|^2$ for a row vector F by calculating $F \cdot F^T$ where the first factor is the complex conjugate of F and the second factor is the transpose of F from a row vector to a column vector.

Because the energy function is quadratic, there are potentially two distinct values of x for which the energy in H is equal to the energy within F or within G. One solution is $x=\tfrac{1}{2}$, for which $H(\omega)=(F(\omega)+G(\omega))/2$ and $H(w+N)=(F(w)-G(w))/2$ for some constant k. This solution is a displacement maximally far from a pixel. This solution is not the correct solution except when the two roots of the quadratic equation are the same and both are equal to $\tfrac{1}{2}$. The solution that is not equal to $\tfrac{1}{2}$ is the correct solution to within high precision for our observations.

To find the value of x that preserves the energy relation and satisfies equation 9, use an iterative method for solving transcendental equations such as the Newton Raphson method. The cost of the solution grows linearly in the size of the spectrum, and the number of iterations in practice is a small constant because precision doubles with each iteration.

Equation 9 is unstable for integer values of x and for values that are almost integers. Fortunately, these values correspond to shifts of an integral (or near integral) number of pixels. In which case, the shift leaves the image essentially unchanged except for a pixel to pixel translation. By assumption a coarse registration algorithm is to be used to register to the nearest pixel, and then the algorithm described in this document is applied to register to the nearest subpixel. If the iterative search for the subpixel values moves to an integral or zero value of the offset, the search can be terminated. The integer estimate for the offset is obtained from the initial registration to the nearest pixel.

Thus, the method of the first embodiment can be generalized as follows with reference to FIG. 4, At step 200, a first image is multiplied by a window function to create a first windowed image. At step 210, the first windowed image is transformed with a Fourier transform to create a first image Fourier transform. At step 220, the second image is multiplied by the window function to create a second windowed image. At step 230, the second windowed image is transformed with a Fourier transform to as create a second image Fourier transform. At step 240, a collection of coordinate pairs are computed from the first and second image Fourier transforms such that at each coordinate pair the values of the first and second image Fourier transforms are likely to have very little aliasing noise. At step 250, an estimate of a linear Fourier phase relation between the first and second image Fourier transforms is computed using the Fourier phases of the first and second image Fourier transforms at the coordinate pairs in a minimum-least squares sense. Lastly, at step 260, the displacements in the x and/or y directions are computed from the linear Fourier phase relationship.

It should be apparent to those in the art that the preferred implementation of the methods described herein are embodied in a program of instructions, such as computer software, which is stored on a program storage device, and is to be carried out by a machine capable of reading and executing such instructions, such as a personal computer. Preferably, each step in the flowchart of FIG. 4 comprises a module within the computer software program.

The method of the second embodiment does not generalize directly to two dimensions because the number of constraint equations in two dimensions is less than the number of unknowns. But the problem can be separated into one-dimensional problems as follows. Construct the Fourier transforms of the rows of each image, thereby creating N pairs of one-dimensional transforms that can be treated using the one-dimensional algorithm above. This produces N estimates of the x-displacement, which then should be averaged into a single estimate. It also produces estimates of the row aliasing spectra for each of the N rows. Similarly, the columns of the two images can be individually transformed and treated by the one-dimensional algorithm to construct N estimates of the y displacement, and estimates of the aliasing spectra for each of the N columns. The x and y estimates can now be used as the initial value of a refinement process that produces final estimates of the displacement. The entire process is described algorithmically below and schematically in FIG. 3.

Refinement process:

Step 1: Form the image rows $f_y(x)$ and $g_y(x)$ from the images $f(x,y)$ and $g(x,y)$ for $0 \leq y < N$.

Step 2: Form the row cross spectra $G_y(\omega)/F_y(\omega)$.

Step 3. For each row cross spectrum, compute the x displacement and the row alias functions $H_n(\omega)$ and $H_n(\omega+N)$ using the one-dimensional algorithm for sub-pixel alignment.

Step 4. Let $x_0$ be the average of the displacements computed in Step 3.

Step 5: Repeat Steps 1 through 4 on the columns of the images to obtain displacement estimate $y_0$ and column alias functions $H_\omega(v)$ and $H_\omega(v+N)$.

Step 6: Form a matrix with N rows and 2N columns with the structure $[H_v(\omega) \; H_v(\omega+N)]$.

Step 7: Take the Fourier transforms of the columns of this matrix. This matrix now has the structure $$[H_1(\omega,v) \; H_1(\omega+N,v)]. \quad (11)$$

Step 8: Repeat Steps 6 and 7 on the rows of the matrix:

$$\begin{bmatrix} H_\omega(v) \\ H_\omega(n+N) \end{bmatrix} \quad (12)$$

This creates the matrix $$\begin{bmatrix} H_2(\omega, v) \\ H_2(\omega+N, v) \end{bmatrix} \quad (13)$$

Step 9: Using $H_1(\omega,v+N)$ and $H_2(\omega+N,v)$ from Steps 7 and 8, form the matrix $H(\omega,v)=G(\omega,v)/F(\omega,v)-H_1(\omega,v)-H_2(\omega,v)$. (The row alias function $H_1$ shifts N positions left to align with H, and the column alias function $H_2(\omega,v)$ shifts upward N positions to align with H.)

Step 10: Calculate x and y offsets by applying the method of the first embodiment to H.

Figure 3:
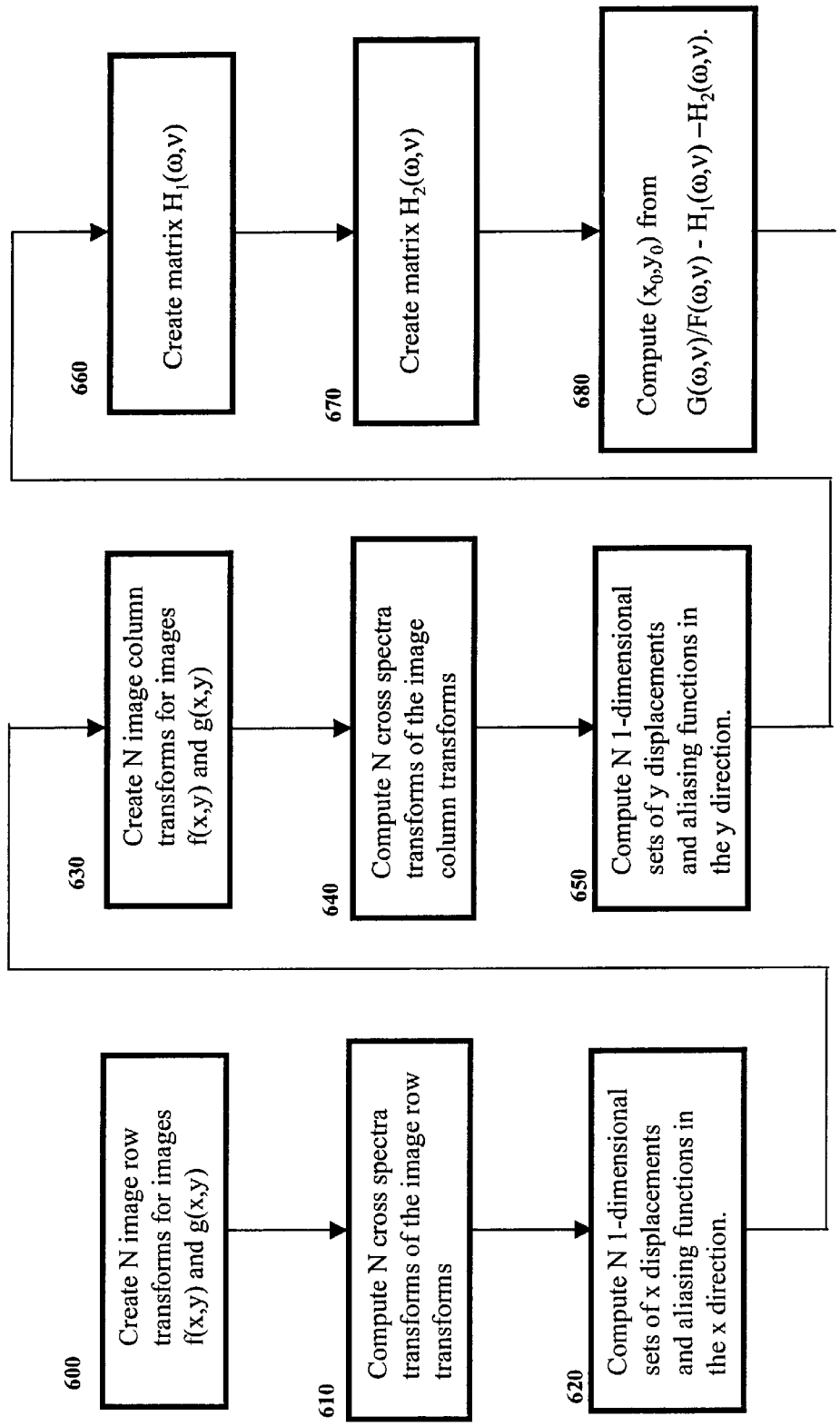
FIG. 3 is a flow chart illustrating the steps of a second method of the present invention.

In FIG. 3, Step 600 creates transforms of the image rows for the two images to be registered and Step 610 creates N cross spectra functions from the row and column pairs of images. Step 620 computes the x and y displacements and the aliasing matrix by using the one-dimensional registration algorithm described in this section. Step 630, 640, and 650 do the corresponding operations for the columns of the two image functions.

Step 660 creates the matrix $H_1(\omega,v)$ from results passed on by Step 620. Step 670 does the same using the matrix data from Step 650. Step 670 calculates $H(\omega,v)$, while Step 680 produces the final estimate.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for registering first and second images which are offset by an x and/or y displacement in sub-pixel locations, the method comprises the steps of:

multiplying the first image by a window function to create a first windowed image;

transforming the first windowed image with a Fourier transform to create a first image Fourier transform;

multiplying the second image by the window function to create a second windowed image;

transforming the second windowed image with a Fourier transform to create a second image Fourier transform;

computing a collection of coordinate pairs from the first and second image Fourier transforms such that at each coordinate pair the values of the first and second image Fourier transforms are likely to have very little aliasing noise;

computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

2. The method of claim 1, wherein the window is a periodic window function.

3. The method of claim 2, wherein the periodic window function is a 3-term Blackman window.

4. The method of claim 2, wherein the periodic window function is a 4-term Blackman-Harris window.

5. The method of claim 1, wherein the window function is a symmetric window function.

6. The method of claim 5, wherein the symmetric window function is a 3-term Blackman window.

7. The method of claim 5, wherein the symmetric window function is a 4-term Blackman-Harris window.

8. The method of claim 1, wherein the step of computing a collection of coordinate pairs comprises fixing the coordinate pairs to lie within a fixed distance of a central peak.

9. The method of claim 1, wherein the step of computing a collection of coordinate pairs comprises fixing the Fourier magnitude of the first image Fourier transform and of the second image Fourier transform to be among the highest predetermined percent of the magnitudes within a fixed distance of a central peak.

10. The method of claim 1, wherein the step of computing a collection of coordinate pairs comprises setting the ratio of the Fourier magnitude of the first image transform to the Fourier magnitude of the second image transform to lie between $1/(1+\rho)$ and $1+\rho$, where $\rho$ is a positive number.

11. The method of claim 10, wherein $\rho$ is between 0.8 and 1.5.

12. The method of claim 1, wherein the step of computing a collection of coordinate pairs comprises a conjunction of two or more of the following:

fixing the coordinate pairs to lie within a fixed distance of a central peak;

fixing the Fourier magnitude of the first image Fourier transform and of the second image Fourier transform to be among the highest predetermined percent of the magnitudes within a fixed distance of a central peak; and setting the ratio of the Fourier magnitude of the first image transform to the Fourier magnitude of the second image transform to lie between $1/(1+\rho)$ and $1+\rho$, where $\rho$ is a positive number.

13. A method for registering first and second images which are offset by an x and/or y displacement in sub-pixel locations, the method comprises the steps of:

registering the first and second images to the nearest pixel location; and registering the first and second images to the nearest sub-pixel location, wherein the registering of the first and second images to the nearest sub-pixel location comprises the steps of:

multiplying the first image by a window function to create a first windowed image;

transforming the first windowed image with a Fourier transform to create a first image Fourier transform;

multiplying the second image by the window function to create a second windowed image;

transforming the second windowed image with a Fourier transform to create a second image Fourier transform;

computing a collection of coordinate pairs from the first and second image Fourier transforms such that at each coordinate pair the values of the first and second image Fourier transforms are likely to have very little aliasing noise;

computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

14. The method of claim 13, wherein the window is a periodic window function.

15. The method of claim 14, wherein the periodic window function is a 3-term Blackman window.

16. The method of claim 14, wherein the periodic window function is a 4-term Blackman-Harris window.

17. The method of claim 13, wherein the window function is a symmetric window function.

18. The method of claim 17, wherein the symmetric window function is a 3-term Blackman window.

19. The method of claim 17, wherein the symmetric window function is a 4-term Blackman-Harris window.

20. The method of claim 13, wherein the step of computing a collection of coordinate pairs comprises fixing the coordinate pairs to lie within a fixed distance of a central peak.

21. The method of claim 13, wherein the step of computing a collection of coordinate pairs comprises fixing the Fourier magnitude of the first image Fourier transform and of the second image Fourier transform to be among the highest predetermined percent of the magnitudes within a fixed distance of a central peak.

22. The method of claim 13, wherein the step of computing a collection of coordinate pairs comprises setting the ratio of the Fourier magnitude of the first image transform to the Fourier magnitude of the second image transform to lie between $1/(1+\rho)$ and $1+\rho$, where $\rho$ is a positive number.

23. The method of claim 22, wherein $\rho$ is between 0.8 and 1.5.

24. The method of claim 13, wherein the step of computing a collection of coordinate pairs comprises a conjunction of two or more of the following:

fixing the coordinate pairs to lie within a fixed distance of a central peak;

fixing the Fourier magnitude of the first image Fourier transform and of the second image Fourier transform to be among the highest predetermined percent of the magnitudes within a fixed distance of a central peak; and setting the ratio of the Fourier magnitude of the first image transform to the Fourier magnitude of the second image transform to lie between $1/(1+\rho)$ and $1+\rho$, where $\rho$ is a positive number.

25. A computer program product embodied in a computer-readable medium for registering first and second images which are offset by an x and/or y displacement in sub-pixel locations, the computer program product comprising:

computer readable program code means for multiplying the first image by a window function to create a first windowed image;

computer readable program code means for transforming the first windowed image with a Fourier transform to create a first image Fourier transform;

computer readable program code means for multiplying the second image by the window function to create a second windowed image;

computer readable program code means for transforming the second windowed image with a Fourier transform to create a second image Fourier transform;

computer readable program code means for computing a collection of coordinate pairs from the first and second image Fourier transforms such that at each coordinate pair the values of the first and second image Fourier transforms are likely to have very little aliasing noise;

computer readable program code means for computing an estimate of a linear Fourier phase relation between the first and second image Fourier transforms using the Fourier phases of the first and second image Fourier transforms at the coordinate pairs in a minimum-least squares sense; and computer readable program code means for computing the displacements in the x and/or y directions from the linear Fourier phase relationship.

26. A program storage device readable by machine, tangibly embodying a program of instructions executable by the machine to perform method steps for registering first and second images which are offset by an x and/or y displacement in sub-pixel locations, the method comprises the steps of:

multiplying the first image by a window function to create a first windowed image;

transforming the first windowed image with a Fourier transform to create a first image Fourier transform;

multiplying the second image by the window function to create a second windowed image;

transforming the second windowed image with a Fourier transform to create a second image Fourier transform;

computing a collection of coordinate pairs from the first and second image Fourier transforms such that at each coordinate pair the values of the first and second image Fourier transforms are likely to have very little aliasing noise;

computing an estimate of a linear Fourier phase relation between the first and second image Fourier transforms using the Fourier phases of the first and second image Fourier transforms at the coordinate pairs in a minimum-least squares sense; and computing the displacements in the x and/or y directions from the linear Fourier phase relationship.

27. A method for registering first and second images which are offset by an x and/or y displacement in sub-pixel locations, the method comprises the steps of:

(a) Fourier transforming the first image to produce a first image Fourier transform;

(b) Fourier transforming the second image to produce a second image Fourier transform;-

(c) summing the energy of the first image Fourier transform and the energy of the second image Fourier transform and dividing the sum by 2 to produce an average image energy;

(d) selecting one or more first displacements for an iterative search;

(e) using each first displacement, the first-image Fourier transform, and the second-image Fourier transform to compute a first baseband-plus-aliasing Fourier transform;

(f) comparing the energy of the first baseband-plus-aliasing Fourier transform to the average image energy;

(g) stopping the search if the energy comparisons are within a fixed precision;

(h) continuing the search if the energy comparisons are not within the fixed precision by selecting a new displacement for the search;

(i) computing a second baseband-plus-aliasing Fourier transform using the new displacement, first-image Fourier transform, and the second-image Fourier transform;

(j) repeating steps (h) and (i) until the fixed precision is reached or a criterion for stopping the search unsuccessfully is satisfied.

* * * * *